United States Patent [19]

Haraikawa

[11] 4,084,664
[45] Apr. 18, 1978

[54] DISC BRAKE

[75] Inventor: Tetsuo Haraikawa, Funabashi, Japan

[73] Assignee: Tokico Ltd., Kawasaki, Japan

[21] Appl. No.: 768,905

[22] Filed: Feb. 15, 1977

[30] Foreign Application Priority Data

Feb. 20, 1976  Japan .................................. 51-17797

[51] Int. Cl.² .............................................. F16D 65/56
[52] U.S. Cl. .............................. 188/71.9; 188/196 BA
[58] Field of Search .............. 188/71.9, 106 F, 196 D, 188/196 BA

[56] References Cited

U.S. PATENT DOCUMENTS

| | | | |
|---|---|---|---|
| 3,789,959 | 2/1974 | Kawaguchi | 188/71.9 |
| 3,920,102 | 11/1975 | Ito | 188/71.9 |
| 3,934,684 | 1/1976 | Evans | 188/71.9 |

*Primary Examiner*—Duane A. Reger
*Attorney, Agent, or Firm*—Schmidt, Johnson, Hovey & Williams

[57] ABSTRACT

An improved disc brake of the type in which a rotatonal operating force is converted into a substantially linear braking force is provided with means for automatically adjusting the brake operating mechanism for normal wear of the brake pad means. The improved brake employs a housing straddling a brake disc and including a first half portion having a first friction pad secured thereto and a second half portion having a through hole; a push rod extending through the through hole and having one end abutting against a second friction pad and the other end provided with adjusting threads; a substantially cylindrical nut extending through the through hole and having at one end an enlarged diameter flange provided with ratchet teeth and at the other end a spring abutment portion, the nut having the threaded inner surface in threaded engagement with said adjusting threads of the push rod; a spring abutting at one end against the second half portion of the housing and at the other end against the spring abutment portion of the nut for normally biasing the nut away from the disc; a movement conversion mechanism provided in the second half portion of the housing and adapted to convert a rotational movement into a linear movement; and a brake lever for imparting a rotational movement to the movement conversion mechanism and a pawl member integrally secured to the brake lever for engaging the ratchet teeth.

5 Claims, 3 Drawing Figures

U.S. Patent  April 18, 1978  4,084,664
FIG. 1
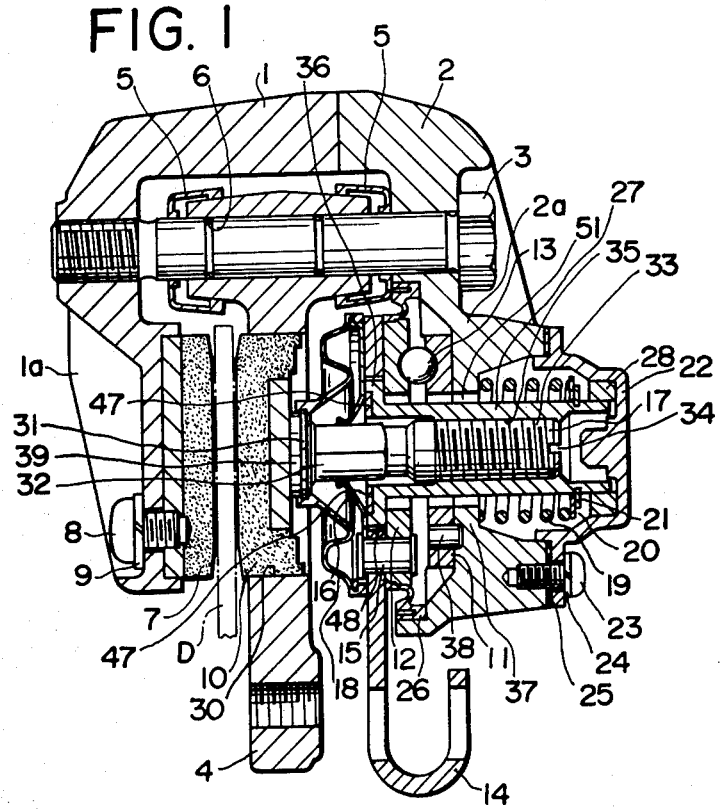
FIG. 2
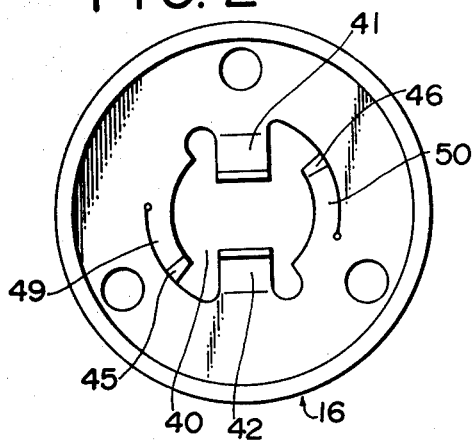
FIG. 3

DISC BRAKE

BACKGROUND OF THE INVENTION

This invention relates to a mechanical disc brake adapted to effect braking by converting a rotation input into a linear output which applies friction pads against a brake disc and more particularly, to a mechanical disc brake having a novel automatic clearance adjusting means which is adapted to adjust the brake clearances between the disc and friction pads to maintain the clearances within a predetermined value range at all times to thereby obtain a predetermined braking force at all times.

The purpose of the present invention is to provide a disc brake in which the clearance adjustment is effected irrespective of deformation of parts of the disc brake.

The above and other objects and attendant advantages of the present invention will be more readily apparent to those skilled in the art from a reading of the following detailed description in connection with the accompanying drawing which shows one preferred embodiment of the invention for illustration purpose only, but not for limiting the scope of the same in any way.

BRIEF DESCRIPTION OF THE DRAWING

FIG. 1 is a horizontally cross-sectional view of one preferred embodiment of disc brake constructed in accordance with the present invention;

FIG. 2 is an elevational view on an enlarged scale of the rotation regulation pawl member of said disc brake as shown in FIG. 1; and FIG. 3 is a vertically cross-sectional view of said rotation regulation pawl member as shown in FIG. 2.

PREFERRED EMBODIMENT OF THE INVENTION

The present invention will be now described referring to the accompanying drawing and more particularly, to FIG. 1 thereof. As shown in FIG. 1, the disc brake generally comprises a housing which consists of a first half portion 1 and a second half portion 2 fastened together by means of a bolt 3. The bolt 3 extends through a guide bore in the bracket 4 of a stationary support (not shown) and has spaced O-rings 6 fitted on a portion of the shank of the bolt so that the bolt is guided for slidable movement relative to the bracket. The opposite ends of the guide bore in the bracket 4 are covered by boots 5, 5 which prevent foreign matter from entering the interface between the bracket guide bore and bolt 3. A pair of friction pads 7, 10 are disposed on the opposite sides of a brake disc D with the pad 7 fixedly secured to the leg 1a of the housing first half portion 1 by means of a set screw 8 and a washer 9 on the screw whereas the pad 10 received within a center opening 30 in the bracket 4 for movement relative to the housing in a manner as will be described hereinbelow. The back or outer side of the movable friction pad 10 is engaged by the enlarged diameter innermost end 39 of a push rod 17 whereby any oblique abutment of the pad against the disc D is prevented. Such oblique abutment of the pad 10 against the disc D may lead to unequal wear of the pad. The leg 2a of the housing second half portion 2 is provided with a stepped center opening 51 defining a shoulder 37 and the above-mentioned push rod 37 extends through the stepped center opening 51 and has a stepped portion 31 which is positioned rearwardly of the innermost end 39 and has a diameter greater than that of the innermost end. The push rod 17 further has a polygonal cross-section portion 32 (square or hexagonal cross-section) positioned rearwardly of the stepped portion 31 and having a diameter smaller than the innermost end 39 and an adjusting threaded portion 33 positioned rearwardly of the polygonal cross-section portion 32 and having a diameter greater than the portion 32, but smaller than that of the innermost end 39. The adjusting threaded portion 33 is provided with a slit 34 in the end thereof remote from the polygonal cross-section portion 32. The adjusting threaded portion 33 threadably receives the threaded inner surface 35 of a nut member 27 disposed about the push rod 17 within the stepped center opening 51 in the housing second half portion 2.

The nut member 27 has an enlarged diameter flange 36 at the inner or left-hand end as seen in FIG. 1 and the flange is provided with radial ratchet teeth 47 on the front or lefthand side face (as seen in FIG. 1). A brake lever 14 having substantially the same thickness as that of the flange 36 on the nut member 27 is provided and the brake lever is provided with an opening 48 inner diameter of which substantially corresponds to the outer diameter of the flange 36 on the nut member 27 and is positioned to receive the flange 36 therein. The brake lever 14 is connected to a cable or the like (not shown) by the manipulation of which a braking force is imparted to the lever as the rotation input to the disc brake.

A stop ring 21 is provided about the nut member 27 in a position adjacent to the outer end thereof and an annular plate 20 is disposed about the nut member 27 and supported by the stop ring 21. A spring 19 extends between the shoulder 37 in the housing second half portion 2 and the annular plate 20 for normally biasing the nut member 27 outwardly or rightwards as seen in FIG. 1 and the outer end of the nut member 27 frictionally engages a friction ring 28 received within a cover 22 which is secured to the leg 2a of the housing second half portion 2. The friction ring 28 is preferably formed of rubber and adapted to hold the nut member 27 against rotation.

The outer or right-hand side face of the flange 36 (as seen in FIG. 1) of the nut member 27 and the outer or right-hand side face of the brake lever 4 (as seen in FIG. 1) positioned radially and outwardly of the flange lie in a common plane and the inner or left-hand side face of a ramp 12 abuts against the coplanar faces of the flange and lever to support the flange and lever faces. The outer or right-hand side face of the ramp 12 (as seen in FIG. 1) is provided with a plurality of inclined grooves (preferably, three inclined grooves) which are conventional and a plurality of simlar grooves are also provided in the inner or left-hand side face of a ramp 11 which is secured to the shoulder 37 in the leg 2a of the second housing half portion 2 by means of supporting members 38 (only one supporting member 38 is shown in FIG. 1). The number of the grooves in the ramp 11 corresponds to the number of corresponding grooves in the ramp 12. The opposed grooves in the ramps 12, 11 are arranged in a plurality of pairs and a steel ball 13 is received in each pair of grooves. A rotation regulation pawl member 16 in the form of a circular leaf spring is provided on the inner or left-hand side face of the lever 14 about the polygonal cross-section portion 32 of the push rod 17. As shown in FIG. 1, the pawl member 16 is integrally secured to the lever 14 and ramp 12 by means of a plurality of rivets 15 (for example, three rivets) disposed in an equally angular spaced relationship.

As is more clearly shown in FIGS. 2 and 3 in which the pawl member is shown on an enlarged scale, the circular pawl member 16 has a cut 40 of a substantially H-shape in the center thereof to provide upper and lower engaging tongues 41, 42 which are positioned in diametrically opposed relationship. The covering leading or free end portions 43, 44 of the engaging tongues 41, 42 are bent forwardly or leftwards as seen in FIG. 3 with the extreme ends thereof bent in the opposite directions away from each other. The bent free end portions 43, 44 of the engaging tongue pieces 41, 42 preferably engage two selected diametrically opposite flat faces of the polygonal cross-section portion 32 of the push rod 17 to regulate the rotation of the push rod 17. The pawl member 16 is also provided with three holes in an equi-angular spaced relationship about the center H-shaped cut 40 for receiving the above-mentioned rivets 15. The periphery of the pawl member 16 is formed with an annular shoulder by bending the outer periphery in the same direction as that in which the free end portions 43, 44 are bent for holding the outer periphery of an annular dust boot 18 (FIG. 1). The inner periphery of the dust boot 18 abuts against the stepped largest diameter portion 31 of the push rod 17 whereby the dust boot 18 perfectly shields the pawl member 16 from the external atmosphere to prevent mud, dust, dirt and other foreign matter from access to the pawl member 16.

As more clearly shown in FIGS. 2 and 3, the center cut 40 in the pawl member 16 is provided with left- and right-hand coaxial arcuate sectors 49, 50 and one end of each of the arcuate sectors 49, 50 is bent in the direction opposite to the direction in which the free end portions 41, 42 of the engaging tongues 41, 42 are bent to thereby provide a pawl 45 or 46. The pawls 45, 46 are so arranged that when the push rod 17 moves in one direction, the pawls engage with the selected ratchet teeth and when the push rod moves in the other or opposite direction, the pawls yield resiliently to disengage from the new engaging ratchet teeth. The pawls 45, 46 are so positioned that when the pawl member 16 is secured to the lever 14 and ramp 12 by the rivets 15, the pawls 45, 46 engage with the selected ratchet teeth 47 on the flange 36 at the inner or left-hand end of the nut member 27.

A dust cover 26 is provided between the outer periphery of the ramp 12 and a selected area of the housing second half portion 2 in a conventional manner to prevent mud and other foreign matter from entering the conventional movement conversion mechanism which is constituted by the ramps 11, 12 and steel balls 13 and adapted to convert a rotation input into a linear thrust.

In the present invention, the engaging tongues 43, 44 of the pawl member 16 may be replaced by another form of rotation regulation means within the scope of the present invention. Such alternative rotation regulation means is formed, for example, by providing a projection of square cross-section on the cover 22 and providing a simlar cross-section hole in the outer or right-hand end portion of the push rod 17 for receiving the projection on the cover 22 to thereby arrest the rotation of the push rod.

In operation, assuming that the friction pads 7, 10 have worn to a predetermined amount or the pads have not yet been adjusted to compensate for the wear amount, when the brake lever 14 is rotated from its initial or normal position by manipulating the cable and the like, the ramp 12 and pawl member 16 rotate in one direction in response to the rotation of the lever 14 whereby the engaging tongues 41, 42 of the pawl member 16 rotate the push rod 17 in the same direction as the ramp 12 and pawl member 16 through the polygonal cross-section portion 32 of the push rod 17. At such a time, the nut member 27 is prevented from rotating because the rotation of the nut member 27 is arrested by the friction ring 28 and as a result, the ratchet teeth 47 on the front or left-hand side face of the nut member 27 remain stationary and the pawls 45, 46 of the pawl member 16 move beyond the ratchet teeth 47. As the ramp 12 rotates, the movement conversion mechanism operates to displace the ramp 12 forwardly or leftwards as seen in FIG. 1. As the ramp 12 displaces in the above-mentioned direction, a forward thrust is imparted to the flange 36 on the nut member 27 and the nut member 27 bodily moves slidably and forwardly within the friction ring 28. As the nut member 27 moves forwardly, the push rod 17 follows the forward movement of the nut member or moves forwardly through the engagement between the threaded inner surface 35 of the nut member 27 and the adjusting threaded portion 33 of the push rod 17 to apply the movable friction pad 10 against the adjacent side of the brake disc D to thereby produce a reaction force when the movement conversion mechanism has advanced the ramp 12 and the thus produced reaction force in turn applies the friction pad 7 against the adjacent side of the disc D through the ramp 11, housing second half portion 2, bolt 3 and housing first half portion 1 whereby braking force is applied on the opposite sides of the disc D.

When the brake lever 14 is released, the lever 14 rapidly returns to its initial position under the action of a return spring (not shown) and the spring 19 and as the lever 14 returns to its initial position, the lever reverse the rotational direction of the pawl member 16. The reversion in the rotational direction of the pawl member 16 rotates the nut member 27 in the same as or now reversed direction of the pawl member 16 through the ratchet teeth 47 on the nut member 27 which is now meshing with the pawls 45, 46 of the pawl member against the friction force provided by the friction ring 28. Therefore, a relative rotational movement occurs between the lever 14 and nut member 27. However, no relative movement occurs between the brake lever 14 and push rod 17 because the lever 14 and rod 17 are connected together by the engaging pieces or bent free end portions 43, 44 of the pawl member 16. Thus, when it is assumed that the nut member 27 has rotated relative to the push rod 17 and the push rod 17 has been fed toward the movable pad 10 by an amount corresponding to the rotation amount of the nut member 27, the clearance magnitude between the movable pad 10 and disc D is reduced.

When the clearance between the pad 10 and disc D has been sufficiently reduced or the wear of the friction pads 7, 10 has been compensated for, in braking, even if the lever 14 is rotated, the pawls 45, 46 of the pawl member 16 adapted to follow the rotation of the lever will not move beyond the ratchet teeth 47 on the nut member 27 and even if the lever 14 is released to return to its initial position, the pawls 45, 46 will not feed the nut member 27 toward the disc D whereby no adjustment is effected.

And when the brake lever 14 is rotated in the braking direction and the push rod 17 moves leftwards as seen in FIG. 1 to apply the pads 7, 10 against the disc D and as the lever further continues to rotate in the braking direction, a great axial thrust is produced in the push rod 17. And as a result, a reaction force is produced in the push rod 17 in response to the axial thrust to cause the outer or right-hand face of the flange 36 on the nut member 27 to firmly abut against the ramp 12 whereby the nut member 27 rotates together with the lever 14 against the retaining force or resistance provided by the friction ring 28. Thus, also in such a case, even when the lever 14 is rotated, the pawls 45, 46 will not move beyond the ratchet teeth 47 on the nut member 27.

As is clear from the foregoing description of the preferred embodiment of the invention, the adjusting action by the ratchet teeth 47 and pawls 45, 46 takes place only when the clearances begween the pads and disc have exceeded a predetermined amount before the pads are applied against the disc D.

Therefore, the factors such as the deformation of the caliper and that of the pads themselves have nothing to do with the above-mentioned adjusting action and there is no possibility of excess adjustment due to deformation of the parts.

When it is desired to replace the pads by new pads, the cover 22 is detached from the housing second half portion 2 after the seals 25, screws 23 and washers 24 have been first removed from the housing second half portion 2, the driver or other suitable tool is inserted into the slit 34 in the outer end of the push rod 17 and the push rod is pushed back into the housing second half portion 2 and thereafter, the replacement of the pads can be easily performed.

As mentioned hereinabove, the disc brake of the present invention has an automatic clearance adjusting function whereby the nut member is rotated by the pawl member to feed the push rod which is in threaded engagement with the nut member to thereby automatically adjust the clearances between the friction pads and disc within a predetermined amount range. Furthermore, the disc brake has the function for prevention of inadvertent rotation of the push rod and thus, the brake disc can be made compact eliminating any useless space.

While only one embodiment of the invention has been shown and described in detail it will be understood that the same is for illustration purpose only and is not to be taken as a definition of the invention, reference being had for this purpose to the appended claims.

What is claimed is:

1. In a disc brake:
   a rotatable disc to be braked;
   fixed support means;
   friction pad means having a friction side for engaging a portion of one side of said disc when the brake is operated and an opposite side to which a substantially linear force may be applied for operating the brake,
   said pad means being shiftably carried by said support means for substantially linear movement thereof between a normal disposition in which said friction side is in adjacent facing relationship to said portion of said disc and a braking disposition in which said friction side is in forceful braking engagement with said portion of said disc;
   housing means carried by said support means and including a leg portion spaced from said opposite side of said pad means in a direction away from said disc,
   said leg portion including wall structure defining an opening therethrough disposed in alignment with said pad means and said portion of said disc;
   tubular nut means having an axis, an internally threaded axial body portion extending through said opening, an out-turned flange portion adjacent one extremity of said body portion disposed between said pad means and marginal parts of said leg portion around the extremity of said opening proximate said pad means, ratchet teeth means on the side of said flange portion facing said pad means, and an external surface adjacent the other extremity of said body portion remote from said pad means;
   operating lever means pivotally mounted on said nut means for rotational movement about said axis of the latter;
   means for mounting said nut means on said leg portion for rotation of said nut means about said axis thereof and for substantially linear movement of said nut means along said axis toward and away from said pad means,
   said mounting means including spring means operably intercoupled with said leg portion and said nut means for yieldably biasing the latter in a direction away from said pad means, and guide means for maintaining said axis of said nut means substantially centered with respect to said opening;
   motion conversion means, including ramp means carried by said lever means and disposed between said flange portion of said nut means and said marginal parts of said leg portion for shifting said lever means and thereby said nut means substantially linearly along said axis toward said pad means when said lever means is turned in one rotational direction thereof;
   push rod means adjustably carried by said nut means and having an externally threaded portion adjacent one extremity thereof threadably received in said body portion, and a stretch, including a portion of polygonal transverse cross-section, extending from said threaded portion along said axis toward and into proximity with said opposite side of said pad means for engagement of the latter by the other extremity of said rod means to apply a substantially linear force to said pad means for shifting the latter into its said braking disposition when said nut means is shifted toward said pad means; and
   means for automatically adjusting for any substantial wear of said pad means by rotating said rod means relative to said nut means to shift said other extremity of said rod means into engagement with said opposite side of said pad means to move the latter into its said normal disposition relative to said portion of said disc,
   said adjusting means including friction means engaging said surface of said body portion to yieldably resist rotation of said nut means, and at least one tongue carried by said lever means and in engagement with said polygonal portion of said rod means for rotating said rod means in response to movement of said lever means in one rotational direction thereof until said rod means has moved said pad means into initial forceful engagement with said portion of said disc.

2. The brake as set forth in claim 1, wherein is provided:

further means, responsive to movement of said lever means in said one rotational direction thereof when said rod means has moved said pad means into initial forceful engagement with said portion of said disc, for rotating said nut means with said rod means to prevent further relative axial movement therebetween as the same are shifted by said motion conversion means toward said pad means for moving the latter into increasingly forceful braking engagement with said portion of said disc, said further means including at least one pawl carried by said lever means and disposed for operable engagement with said ratchet teeth means on said flange portion of said nut means for turning the latter against the resistance of said friction means when said nut means is subjected to reaction forces exerted thereon by said rod means when said pad means has been shifted into forceful engagement with said portion of said disc.

3. The brake as set forth in claim 2, wherein said tongue and said pawl comprise integral parts formed in a resilient plate secured to said lever means.

4. The brake as set forth in claim 1, wherein said body portion of said nut means is of substantially lesser external transverse size than corresponding internal dimensions of said opening, said body portion being thereby loosely received within said opening in spaced relationship to the wall structure of said leg portion defining said opening, and said nut means being thereby floatingly mounted on said leg portion of said housing means.

5. The brake as set forth in claim 1, wherein said housing means is shiftably mounted on said support means for floating movement in either direction along a path substantially parallel to the axis of rotation of said disc, said housing means includes a second leg portion spaced from a portion of the opposite side of said disc aligned with said portion of said one side of said disc, and there is provided a second friction pad means mounted on said second leg portion, said second pad means being shiftable toward and into forceful braking engagement with said portion of said opposite side of said disc when said housing is shifted in the same direction in reaction to the forceful engagement of said first-mentioned pad means with said portion of said one side of said disc.

* * * * *